May 30, 1972  E. M. CURTIS ET AL  3,666,331
BALL AND SOCKET BEARING
Filed Oct. 27, 1970
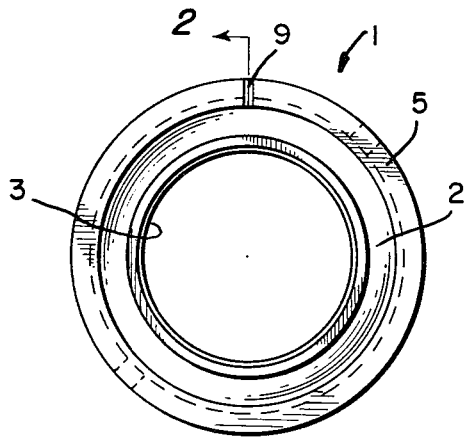
FIG. 1
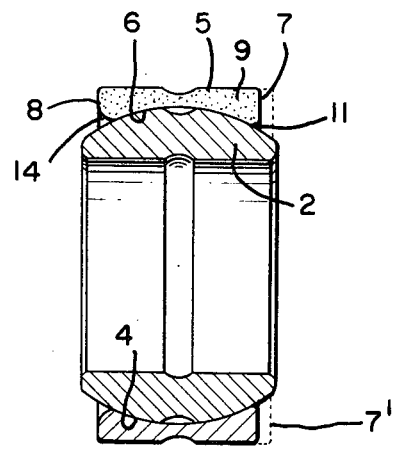
FIG. 2
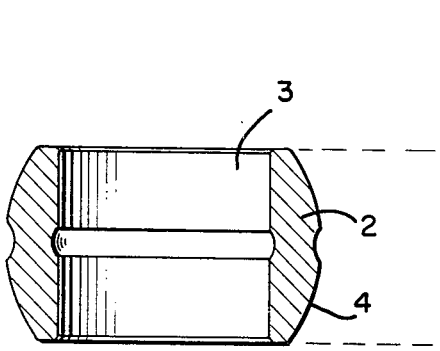
FIG. 3
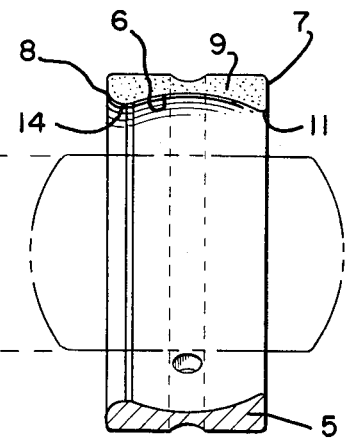
INVENTORS
ROGER E. PARDON
EARL M. CURTIS
BY
David W. Tillott
ATTORNEY

United States Patent Office 3,666,331
Patented May 30, 1972

3,666,331
BALL AND SOCKET BEARING
Earl M. Curtis, Torrington, Conn., and Roger E. Pardon, Naperville, Ill., assignors to The Torrington Company, Torrington, Conn.
Filed Oct. 27, 1970, Ser. No. 84,340
Int. Cl. F16c 23/04
U.S. Cl. 308—72                         3 Claims

ABSTRACT OF THE DISCLOSURE

A ball and socket type of bearing including a socket containing a single fracture or dividing location and having its internal spherical surface cut away adjacent only one end face of the socket thereby allowing the socket to provide a large surface area for resisting axial loads acting to force the ball out of the socket through its other end face.

BACKGROUND OF THE INVENTION

This invention relates generally to bearings and more particularly to self-aligning bearings of the ball and socket type.

The U.S. Pat. No. 2,681,259 discloses a self-aligning bearing of this type and called a "double-fracture" bearing. This bearing includes a ball containing a shaft opening and having a spherical outer surface. The ball is housed in a socket containing a spherical inner surface snugly receiving the ball and being divided into two semi-arcuate segments to allow the installation of the ball therein. This is the reason it is called a "double-fracture" bearing. After the ball is installed in the socket segments, the socket is held together by a cup or sleeve surrounding the socket. The end faces of this two-segment socket can be extended around the ball sufficiently to provide relatively large supporting surfaces for resisting axial loads on the ball. On the other hand, this type of socket has the disadvantage of having to be divided into separate segments which require an additional member for holding them together following assembly.

Another type of bearing in use today is called a "single-fracture" bearing. In this type, the socket is split in only a single place and otherwise remains in one piece so that it can be spread at its single split to allow the ball to be inserted. After the ball is in the socket, it will spring back to its original condition. A disadvantage of this type is that the internal surface of the socket must be substantially cut away adjacent its end faces to allow the ball to be inserted without spreading the socket too far. This cutting away of the internal surface of the socket reduces the area of the surface that can resist axial loads on the ball. Thus, this "single-fracture" bearing is not generally used where the bearing carries substantial axial loads.

SUMMARY OF THE INVENTION

The principal object of this invention is to provide a ball and socket bearing that substantially eliminates or minimizes the problems with the foregoing prior art bearings.

Another important object of this invention is to provide a ball and socket bearing that requires only a single fracture or separation for assembly and provides relative large areas for supporting axial loads acting in a single direction.

In general, the foregoing objects are achieved by providing a "single-fracture" bearing with an extended internal spherical surface adjacent one end face, like in a "double-fracture" bearing, whereby the bearing has a relatively large area to support axial loads acting in a single direction. In many bearing applications, the bearing is required to resist axial loads acting in only a single direction. In other words, this invention involves the concept of cutting away the internal surface of the socket adjacent only one of its end faces for insertion of the ball from that end.

BRIEF DESCRIPTION OF THE DRAWING

The invention is described in connection with the accompanying drawing wherein:

FIG. 1 is an end or face view of a bearing embodiment of the invention;

FIG. 2 is a diametrical section taken on line 2—2 in FIG. 1; and

FIG. 3 is a diametrical section and exploded view illustrating the insertion of the ball into the socket.

DESCRIPTION OF THE PREFERRED EMBODIMENT

The bearing 1 shown in the drawing comprises an internal ball 2 containing an axial bore or journal 3 adapted to receive and serve as a bearing for a shaft and having an external spherical surface 4. The ball 2 used in this invention is identical to those used in the prior art bearings of this type.

The socket 5 includes an internal spherical surface 6 adapted to snugly receive the ball 2 in an arrangement allowing the ball to pivot therein for alignment purposes. The socket 5 further includes a pair of respective end faces 7 and 8 and a longitudinally extending separation or split 9. The split 9 normally is a fracture and is provided for allowing the socket to be spread during the installation of the ball 2 therein as illustrated in FIG. 3. The internal surface 6 of the socket 5 extends substantially to the end face 7 where it forms with the end face 7 a very slightly rounded corner 11. The rounding of the corner 11 is limited to a minimum radius to allow the internal surface 6 to extend sufficiently far to provide the socket 5 with a large area to resist axial loads attempting to force the ball out of the socket through the end face 7.

The internal surface 6 of the socket 5 is cut away adjacent the end face 8 to provide a rounded corner 14 having a relatively large radius as compared to the corner 11 thereby reducing the surface area in the socket that can resist an axial load attempting to force the ball 2 from the socket through the end face 8. The large corner 14 is necessary to allow the insertion of the ball 2 into the socket 5 without requiring that the socket be spread unduly wide at the split 9. Otherwise, if it were not for the rounded corner 14, the socket 5 would have to be spread too wide to avoid its breaking into plural segments. After the ball 2 is installed, the socket 5 springs back to its original position to close the split 9 and it does not require an extra member for holding the socket 5 assembled around the ball 2 during shipping and prior to assembly with a shaft and a bearing mounting apparatus, where it is ultimately used.

FIG. 2 further illustrates a second embodiment wherein the end face 7 is extended longitudinally as shown in the dotted lines indicated by the reference number 7'. This embodiment will further increase the area of the internal supporting surface of the socket 5 capable of resisting axial loads acting in a direction attempting to force the ball 2 out of the socket through the end face 7.

Although two embodiments of the invention have been specifically described, the invention should not be considered as being limited to these embodiments and is only limited by the spirit and scope of the following claims.

We claim:
1. A self-aligning ball and socket bearing comprising: an inner ball having an opening for receiving a shaft and a spherical outer surface;

an annular outer socket having first and second spaced end faces and an internal spherical surface adapted to snugly receive and surround said ball in a manner allowing the ball to pivot in said socket for alignment purposes;

said socket bearing being separated along its periphery as a dividing location while being otherwise integral wherein the socket can be spread at said dividing location to allow the installation of said ball therein and will thereafter spring back to its original condition snugly grasping said ball;

the internal surface of said socket being asymmetrical in longitudinal cross section by extending spherically inwardly adjacent the first end face to provide a maximum axial bearing area, the inner diameter of the first end face being smaller than the inner diameter of the second end face, and the internal surface of said socket intersecting the second end face with a larger radius corner than its intersection with the first end face to allow said ball to be inserted therein while the socket is spread at said dividing location.

2. The bearing of claim 1 wherein:

the separation at said dividing location is a fracture created by breaking said socket generally along a line parallel to its longitudinal axis.

3. A self-aligning ball and socket bearing comprising:

an inner ball having an opening for receiving a shaft and a spherical outer surface;

an annular outer socket having a pair of spaced end faces and an internal spherical surface adapted to snugly receive and surround said ball in a manner allowing the ball to pivot in said socket for alignment purposes;

said socket being separated along its periphery at a dividing location while being otherwise integral wherein the socket can be spread at said dividing location to allow the installation of said ball therein and will thereafter spring back to its original condition snugly grasping said ball;

the internal surface of said socket extending spherically inwardly adjacent one of its end faces to provide a maximum bearing surface resisting axial loads on said ball attempting to force said ball out of said one end face of said socket; and said socket having at the other end face a rounded corner of substantial radius interconnecting the internal surface of said socket and a larger diameter opening than said one end face to allow said ball to be inserted therein while the socket is spread at said dividing location.

References Cited

UNITED STATES PATENTS

| | | | |
|---|---|---|---|
| 3,179,477 | 4/1965 | Carter | 308—72 |
| 3,226,141 | 12/1965 | Sullivan, Jr. | 308—72 |
| 3,499,201 | 3/1970 | Roos | 308—72 |
| 3,464,747 | 9/1969 | Schmidt | 308—72 |

MARTIN P. SCHWADRON, Primary Examiner

F. SUSKO, Assistant Examiner